(12) United States Patent
Tanaka et al.

(10) Patent No.: US 9,007,399 B2
(45) Date of Patent: Apr. 14, 2015

(54) INFORMATION PROCESSING APPARATUS AND METHOD FOR GENERATING IMAGE OF VIRTUAL SPACE

(75) Inventors: Yasumi Tanaka, Funabashi (JP); Naohito Nakamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 704 days.

(21) Appl. No.: 13/217,689

(22) Filed: Aug. 25, 2011

(65) Prior Publication Data
US 2012/0050281 A1 Mar. 1, 2012

(30) Foreign Application Priority Data

Aug. 31, 2010 (JP) ................................ 2010-195073

(51) Int. Cl.
G09G 5/00 (2006.01)
G06T 15/00 (2011.01)
G06T 17/00 (2006.01)
G06T 19/00 (2011.01)
H04N 13/04 (2006.01)

(52) U.S. Cl.
CPC ............ G06T 19/006 (2013.01); *H04N 13/044* (2013.01); G06T 17/00 (2013.01)

(58) Field of Classification Search
CPC .................................................. G06T 19/006
See application file for complete search history.

(56) References Cited

U.S. PATENT DOCUMENTS 5,293,455 A * 3/1994 Castelaz .......................... 706/25
6,792,398 B1 * 9/2004 Handley et al. .................. 703/2
7,663,649 B2 2/2010 Takemoto et al.
2005/0231532 A1 * 10/2005 Suzuki et al. ................ 345/633
2009/0195557 A1 8/2009 Nakamura
2010/0277572 A1 11/2010 Nakamura et al.

FOREIGN PATENT DOCUMENTS

JP 3944019 B2 7/2007

OTHER PUBLICATIONS

Piekarski et al.; Augmented reality working planes: a foundation for action and construction at a distance; Mixed and Augmented Reality, 2004. ISMAR 2004. Third IEEE and ACM International Symposium on, pp. 162-171; 2004.*
Fiorentino et al.; Spacedesign: a mixed reality workspace for aesthetic industrial design; Mixed and Augmented Reality, 2002. ISMAR 2002. Proceedings. International Symposium on; 2002.*

(Continued)

*Primary Examiner* — Carlos Perromat
(74) *Attorney, Agent, or Firm* — Fitzpatrick, Cella, Harper & Scinto (57) ABSTRACT

In an information processing apparatus, a virtual object shape storage unit acquires the position of an operation unit, sets a virtual plane at the acquired position in the virtual space, and records the trajectory of the operation unit after the virtual plane is set. The virtual object shape storage unit then obtains a projection trajectory by projecting the trajectory onto the virtual plane, and records the obtained projection trajectory as contour data representing the contour of a target virtual object on the virtual plane. And then, the apparatus acquires a position and orientation of a viewpoint of the user, and generates and outputs an image of the virtual space seen from the viewpoint on the basis of the acquired position and orientation, the virtual space including the virtual plane and the virtual object having the contour represented by the contour data.

12 Claims, 10 Drawing Sheets

(56) References Cited

OTHER PUBLICATIONS

Piekarski, Interactive 3D Modelling in Outdoor Augmented Reality Worlds, Research Thesis; University of South Australia, 2004.*

T. Igarashi, et al., "Teddy: A Sketching Interface for 3D Freeform Design", In SIGGRAPH '99 Proceedings, pp. 409-416, 1999.

Tomoyuki Inoue, Naoki Nishizumi, Nobuaki Suzuki, Naofumi Yasufuku, and Sato Saga, "Proposal of 3-D Modeling Interface 'BlueGrotto' on the Basis of Drawing Gesture Identification in Virtual Space", IEICE Trans. (D-II), J87-D-II, 6, (Jun. 2004), pp. 1,309-1318.

H. Yoshimori, M. Matsumiya, H. Iwasa, H. Takemura, N. Yokoya, Combination of Two- and Three-Dimensional Space for Solid Modeling, Human Interface Society, Feb. 21, 2000, vol. 2, No. 1, pp. 13-18, Japan.

\* cited by examiner

INFORMATION PROCESSING APPARATUS AND METHOD FOR GENERATING IMAGE OF VIRTUAL SPACE

BACKGROUND OF THE INVENTION

1. Field of the Invention

The present invention relates to a technique for creating a virtual object in a composite space of a physical space and a virtual space.

2. Description of the Related Art

In the manufacturing design field, a three-dimensional CAD system has conventionally been used to design a three-dimensional model. In the conventional three-dimensional CAD system, when the operator creates a three-dimensional model using a display (monitor) and a mouse, he or she generally sets a plane to serve as a reference, creates the bottom surface of a three-dimensional model on the plane, and determines its height, thereby generating a three-dimensional model.

Also, a system capable of using an HMD (Head-Mounted Display) to design a three-dimensional model using a three-dimensional CAD system in a virtual reality space is under study (non-patent literature 1 (Tomoyuki Inoue, Naoki Nishizumi, Nobuaki Suzuki, Naofumi Yasufuku, and Sato Saga, "Proposal of 3-D Modeling Interface 'BlueGrotto' on the Basis of Drawing Gesture Identification in Virtual Space", IEICE Trans. (D-II), J87-D-II, 6, (2004-06), pp. 1,309-1318)).

Moreover, a system capable of creating a model as long as the operator simply draws the contour of a three-dimensional model that he or she wants to generate is under study (non-patent literature 2 (T. Igarashi, S. Matsuoka, and H. Tanaka, Teddy: A sketching interface for 3D freeform design. In SIGGRAPH '99 Proceedings, pp. 409-416, 1999)) in order to easily create a three-dimensional model without requiring expertise on the side of the operator in a design system such as three-dimensional CAD.

On the other hand, in recent years, studies pertaining to an MR (Mixed Reality) are being actively conducted, with the aim of seamlessly combining a physical space and a virtual space. An image display apparatus which presents a mixed reality has, for example, the following configuration. That is, this device displays an image in which a virtual space image (for example, a virtual object or text information rendered by computer graphics) generated in accordance with the position and orientation of an image sensing device such as a video camera is superimposed and rendered on a physical space image sensed by the image sensing device. An HMD (Head-Mounted Display), for example, can be used as this device.

This image display device can also be implemented by a scheme in which a virtual space image generated in accordance with the position and orientation of the viewpoint of the operator is displayed on an optical see-through display mounted on the operator's head.

Various interfaces used to manipulate a virtual reality space or a mixed reality space have been proposed for an image display device which presents the virtual reality space or the mixed reality space to the operator (patent literature 1 (Japanese Patent No. 03944019)). With a combination of the above-mentioned techniques, a three-dimensional model can be created in a virtual reality space or a mixed reality space.

In a conventional method, when the operator creates a virtual object in a virtual reality space or a mixed reality space, he or she performs modeling using an arbitrary plane determined in advance as a reference. With this method, it is possible to create a virtual object on an arbitrary plane, but it is difficult for the operator to create a virtual object at a position where he or she wants to create it in a virtual reality space or a mixed reality space. At this time, when the operator creates a virtual object, it is necessary to automatically determine an arbitrary plane by an operator's operation to allow creation of a virtual object.

SUMMARY OF THE INVENTION

The present invention has been made in consideration of the above-mentioned problem, and provides a technique for creating a virtual object at a position intended by the user in a virtual reality space or a mixed reality space.

According to one aspect of the present invention, there is provided an information processing apparatus comprising: a first acquisition unit which acquires a position of a pointing device operated by a user; a setting unit which sets a virtual plane at the position, that is acquired by the first acquisition unit, in a virtual space; a first recording unit which records a trajectory of the pointing device after the virtual plane is set; a second recording unit which obtains a projection trajectory by projecting the trajectory onto the virtual plane, and records the obtained projection trajectory as contour data representing a contour of a virtual object on the virtual plane; a second acquisition unit which acquires a position and orientation of a viewpoint of the user; a generation unit which generates an image of the virtual space seen from the viewpoint on the basis of the acquired position and orientation, the virtual space including the virtual plane and the virtual object having the contour represented by the contour data; and an output unit which outputs the generated image of the virtual space.

According to another aspect of the present invention, there is provided an information processing method comprising: a first acquisition step of acquiring a position of a pointing device operated by a user; a setting step of setting a virtual plane at the position, that is acquired in the first acquisition step, in a virtual space; a first recording step of recording a trajectory of the pointing device after the virtual plane is set; a second recording step of obtaining a projection trajectory by projecting the trajectory onto the virtual plane, and recording the obtained projection trajectory as contour data representing a contour of a virtual object on the virtual plane; a second acquisition step of acquiring a position and orientation of a viewpoint of the user; a generation step of generating an image of the virtual space seen from the viewpoint on the basis of the acquired position and orientation, the virtual space including the virtual plane and the virtual object having the contour represented by the contour data; and an output step of outputting the generated image of the virtual space.

Further features of the present invention will become apparent from the following description of exemplary embodiments with reference to the attached drawings.

DESCRIPTION OF THE EMBODIMENTS

Embodiments of the present invention will be described below with reference to the accompanying drawings. Note that the embodiments to be described hereinafter exemplify a case in which the present invention is actually practiced, and are practical embodiments of the configuration defined in claims.

First Embodiment

A system according to this embodiment will be described first with reference to a block diagram shown in FIG. 1 and an external view shown in FIG. 2. A magnetic field generation device 2020 which generates a magnetic field is provided at a predetermined position in a physical space, as shown in FIG. 2. A sensor controller 2030 controls the operation of the magnetic field generation device 2020.

An HMD 1000 that is a head-mounted display is equipped with a head position and orientation measurement unit 1020 serving as a magnetic sensor (for example, a 3D SPACE FASTRAK sensor available from Polhemus Inc.). The head position and orientation measurement unit 1020 measures a change in magnetic field corresponding to its position and orientation in a magnetic field generated by the magnetic field generation device 2020, and sends the measurement result to the sensor controller 2030. Based on the received measurement result, the sensor controller 2030 generates a signal value representing the position and orientation of the head position and orientation measurement unit 1020 in a sensor coordinate system, and sends it to an information processing apparatus 1900. The sensor coordinate system means herein a coordinate system which has the position of the magnetic field generation device 2020 as its origin, and three axes orthogonal to each other at this origin as its X-, Y-, and Z-axes. For the sake of descriptive simplicity, the following description assumes that the origin and three axes of a coordinate system which defines a virtual space coincide with those of the sensor coordinate system. However, even if the former and latter coordinate systems have a shift between them, a coordinate value in one coordinate system can be converted into that in the other coordinate system as long as the shift is known.

Also, an operation unit 1090 (for example, a stylus) serving as a pointing device which is operated by the user, who wears the HMD 1000 on his or her head, while he or she holds it with his or her hand is equipped with an operation unit position and orientation measurement unit 1070 serving as a magnetic sensor similar to the head position and orientation measurement unit 1020. Like the head position and orientation measurement unit 1020, the operation unit position and orientation measurement unit 1070 also measures a change in magnetic field corresponding to its position and orientation, and sends the measurement result to the sensor controller 2030. Based on the received measurement result, the sensor controller 2030 generates a signal value representing the position and orientation of the operation unit position and orientation measurement unit 1070 (the position and orientation of the operation unit 1090) in the sensor coordinate system, and sends it to the information processing apparatus 1900.

Note that in this embodiment, a measurement method which uses a magnetic sensor is adopted as a position and orientation measurement method. However, this embodiment does not depend on the position and orientation measurement method, so a position and orientation measurement method which uses a sensor other than a magnetic sensor, such as an optical sensor or an ultrasound sensor, may be adopted. Also, a method of attaching an image sensing device to the HMD 1000, and estimating the position and orientation of the image sensing device from an image sensed by the image sensing device may be adopted. Moreover, a plurality of position and orientation measurement methods may be used in combination.

The HMD 1000 is also provided with a display unit 1030 used to present images to the right and left eyes, respectively, of the user who wears the HMD 1000 on his or her head. Hence, the user who wears the HMD 1000 on his or her head observes a right-eye display unit 1030 with his or her right eye, and observes a left-eye display unit 1030 with his or her left eye. As a matter of course, the provision of the two display units 1030 to the HMD 1000 is merely an example, so a single display unit 1030 to be commonly observed by the user with his or her both right and left eyes may be provided to the HMD 1000. The display unit 1030 displays an image and text sent from the information processing apparatus 1900.

The operation unit 1090 is provided with an event input unit 1060 which is operated by the user to generate an event. The event input unit 1060 is, for example, a button which can be pressed, and the user presses this button when he or she wants to generate an event. Upon pressing this button, the operation unit 1090 generates an event, and outputs it to the information processing apparatus 1900.

A head position and orientation estimation unit 1050 provided in the information processing apparatus 1900 acquires "a signal value representing the position and orientation of the head position and orientation measurement unit 1020 in the sensor coordinate system" via the sensor controller 2030 from the head position and orientation measurement unit 1020. The head position and orientation estimation unit 1050 adds "the position and orientation relationship between the display unit 1030 (viewpoint) and the head position and orientation measurement unit 1020" measured in advance to the position and orientation represented by the acquired signal value, thereby obtaining "the position and orientation of the viewpoint in the sensor coordinate system". Note that the processing for obtaining "the position and orientation of the viewpoint in the sensor coordinate system" is not limited to this, and various types of processing are available. A method of obtaining that position and orientation using a feature point at a known position in a physical space, or a method of estimating and correcting a measurement error generated by the head position and orientation measurement unit 1020, for example, may be adopted.

A virtual object shape storage unit 1080 sets a virtual plane 2000 (to be described later) using, for example, the position and orientations of the operation unit 1090 and viewpoint, and records the trajectory of the operation unit 1090 after setting the virtual plane 2000. The virtual object shape storage unit 1080 then records, as the contour data of a target virtual object 2010 on the virtual plane 2000, a projection trajectory obtained by projecting the recorded trajectory onto the virtual plane 2000 (onto the virtual plane).

Figure 3:
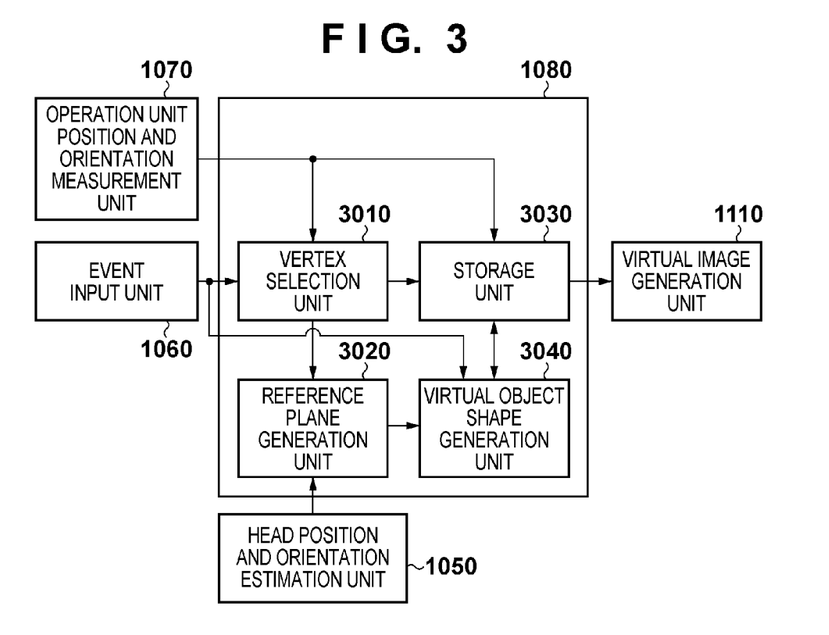
FIG. 3 is a block diagram illustrating a configuration example of a virtual object shape storage unit 1080.
Figure 4:
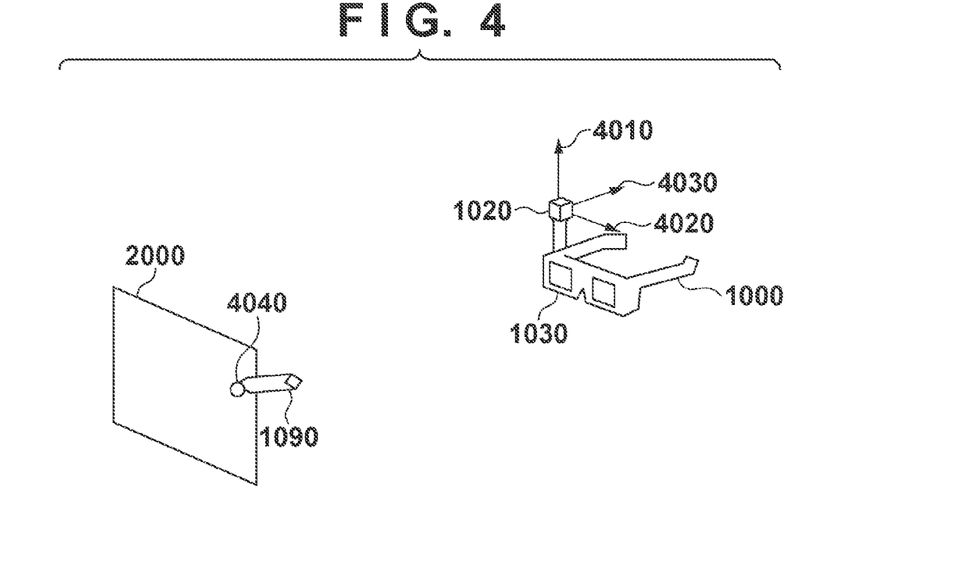
FIG. 4 is a view for explaining the operation of the virtual object shape storage unit 1080.

The more detailed configuration of the virtual object shape storage unit 1080 will be described with reference to a block diagram shown in FIG. 3. Assume herein a local coordinate system having the position of the head position and orientation measurement unit 1020 as its origin, and three axes orthogonal to each other at this origin as an X-axis 4020, a Y-axis 4010, and a Z-axis 4030, as shown in FIG. 4.

First, when the user who wears the HMD 1000 on his or her head operates the event input unit 1060, the event input unit 1060 generates an event, and outputs it to a vertex selection unit 3010 in the virtual object shape storage unit 1080.

Upon detecting this event, the vertex selection unit 3010 extracts "the position" of "the position and orientation of the operation unit 1090 in the sensor coordinate system" acquired via the sensor controller 2030 from the operation unit position and orientation measurement unit 1070 around the timing of this detection. The vertex selection unit 3010 then positions a vertex 4040 at the extracted position in a virtual space. The vertex 4040 may be visible or invisible.

A reference plane generation unit 3020 extracts "the orientation" of "the position and orientation of the viewpoint of in the sensor coordinate system" obtained by the head position and orientation estimation unit 1050 around "the timing when the vertex selection unit 3010 has detected the event". The reference plane generation unit 3020 then obtains, as a virtual plane (reference plane) 2000, a plane which has an orientation vector (a vector along the Z-axis 4030) represented by the extracted orientation as a normal vector to it and includes the vertex 4040. For example, letting (x0,y0,z0) be the coordinate position of the vertex 4040, and (a,b,c) be the orientation vector of the viewpoint, the virtual plane 2000 is described by:

$$a(x-x0)+b(y-y0)+c(z-z0)=0$$

The reference plane generation unit 3020 positions (sets) the thus obtained virtual plane 2000 in the virtual space.

Figure 5:
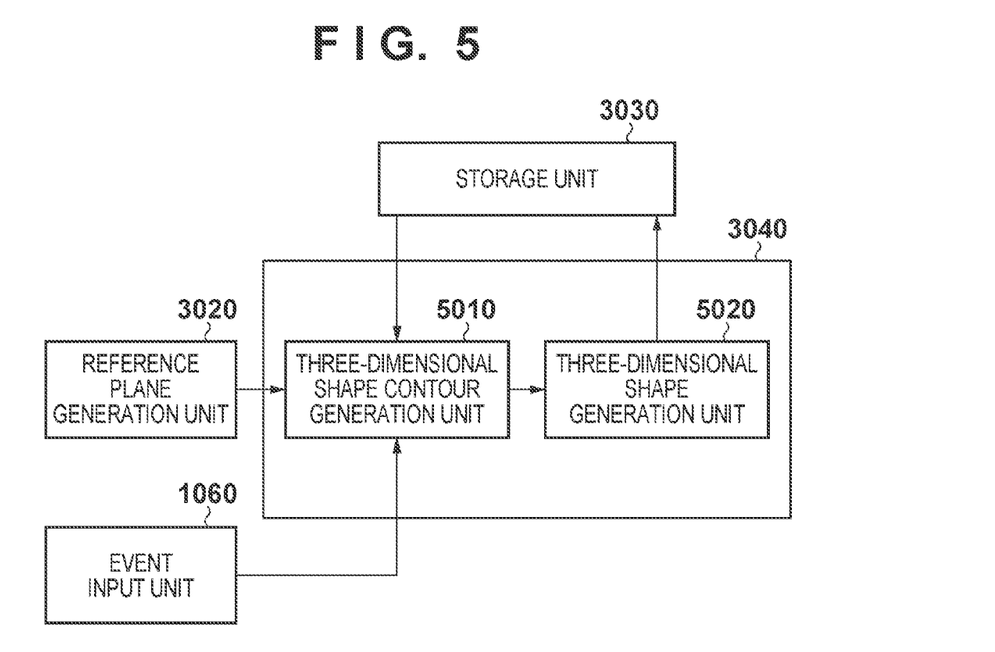
FIG. 5 is a block diagram illustrating a configuration example of a virtual object shape generation unit 3040.

After the virtual plane 2000 is set, a virtual object shape generation unit 3040 records the trajectory of the operation unit 1090, and records, as the contour data of the target virtual object 2010 on the virtual plane 2000, a projection trajectory obtained by projecting the recorded trajectory onto the virtual plane 2000. The more detailed configuration of the virtual object shape generation unit 3040 will be described with reference to a block diagram shown in FIG. 5.

A storage unit 3030 sequentially records "the positions and orientations of the operation unit 1090 in the sensor coordinate system" which are measured by the operation unit position and orientation measurement unit 1070 and sent from the sensor controller 2030.

After the virtual plane 2000 is set, when the user moves the operation unit 1090 to a desired position, and operates the event input unit 1060 at this position, the operation unit 1090 generates an event, and outputs it to a three-dimensional shape contour generation unit 5010. Upon detecting this event, the three-dimensional shape contour generation unit 5010 reads out "the position and orientation of the operation unit 1090 in the sensor coordinate system" stored in the storage unit 3030 around the timing of this detection. The readout position and orientation are the position and orientation of the operation unit 1090 around the timing when the user has operated the event input unit 1060. The three-dimensional shape contour generation unit 5010 then extracts "the position" of the readout position and orientation, and positions a vertex at the extracted position in a virtual space. The three-dimensional shape contour generation unit 5010 performs such vertex positioning processing every time it detects an event. As a result, the three-dimensional shape contour generation unit 5010 positions a vertex at the position of the operation unit 1090 in the virtual space in every operation of the event input unit 1060. A set of thus positioned vertices represent the trajectory of the operation unit 1090.

Figure 6A:
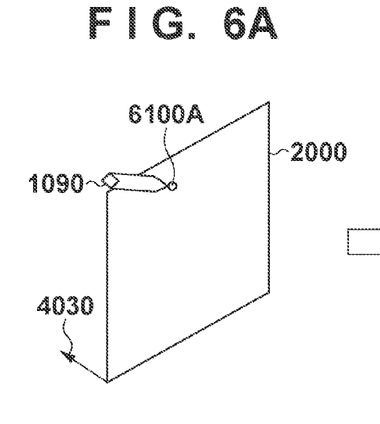
FIGS. 6A to 6D are views showing a procedure for generating a target virtual object 2010.
Figure 6B:
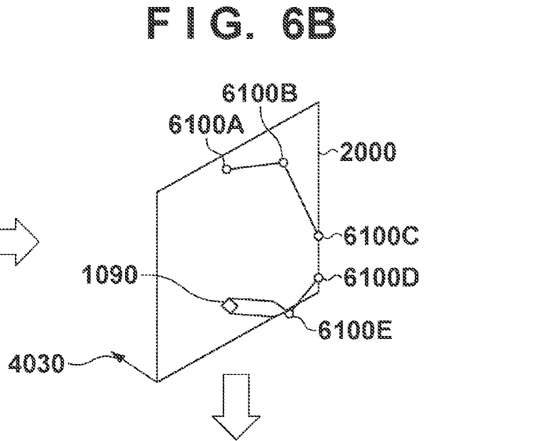
Figure 6C:
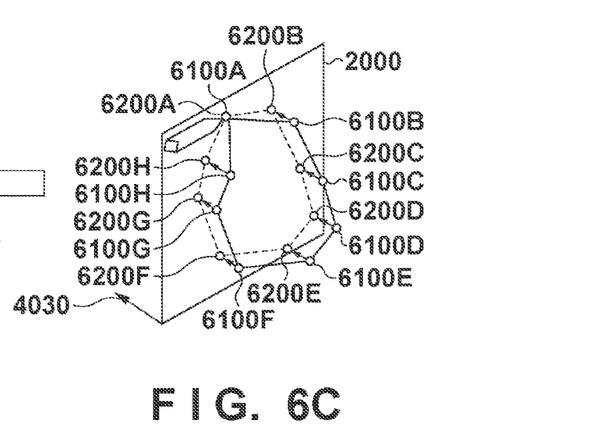

Note that the vertex positioned by the three-dimensional shape contour generation unit 5010 when the user operates the event input unit 1060 for the first time after the virtual plane 2000 is set is assumed to be a vertex 6100A, as shown in FIG. 6A. Next, the vertex positioned by the three-dimensional shape contour generation unit 5010 when the user operates the event input unit 1060 for the first time after the vertex 6100A is positioned is assumed to be a vertex 6100B, as shown in FIG. 6B. The vertex positioned by the three-dimensional shape contour generation unit 5010 when the user operates the event input unit 1060 for the first time after the vertex 6100B is positioned is assumed to be a vertex 6100C, as shown in FIG. 6B. The vertex positioned by the three-dimensional shape contour generation unit 5010 when the user operates the event input unit 1060 for the first time after the vertex 6100C is positioned is assumed to be a vertex 6100D, as shown in FIG. 6B. The vertex positioned by the three-dimensional shape contour generation unit 5010 when the user operates the event input unit 1060 for the first time after the vertex 6100D is positioned is assumed to be a vertex 6100E, as shown in FIG. 6B. In this way, the vertices 6100A, 6100B, 6100C, 6100D, 6100E, 6100F, 6100G, and 6100H are assumed to be arranged in this order, as shown in FIG. 6C.

The three-dimensional shape contour generation unit 5010 performs vertex positioning processing, as mentioned above, until it detects input of an event representing the end of vertex positioning via, for example, the event input unit 1060 or an operation input device (not shown) provided in the information processing apparatus 1900.

If the three-dimensional shape contour generation unit 5010 detects input of an event representing the end of vertex positioning, it advances to the next process. The following description assumes that an event representing the end of vertex positioning is input the moment the vertices 6100A to 6100H have been arranged.

Upon detecting an event representing the end of vertex positioning, the three-dimensional shape contour generation unit 5010 obtains a straight line which passes through the vertex 6100A and has a direction vector defining a direction (a direction along the Z-axis 4030) represented by the orientation vector of the viewpoint, and obtains an intersection point between the obtained straight line and the virtual plane 2000. The three-dimensional shape contour generation unit 5010 then positions a projection vertex 6200A corresponding to the vertex 6100A at the position of the obtained intersection point. That is, the three-dimensional shape contour generation unit 5010 positions the projection vertex 6200A at the position (projection position) at which the vertex 6100A is projected onto the virtual plane 2000 along a direction (a direction along the Z-axis 4030) represented by the orientation vector of the viewpoint, as shown in FIG. 6C. The three-dimensional shape contour generation unit 5010 performs the same projection processing individually for the vertices 6100B to 6100H to arrange projection vertices 6200B to 6200H, respectively, on the virtual plane 2000, as shown in FIG. 6C.

The three-dimensional shape contour generation unit 5010 then records, as contour data, a set of the projection vertices 6200A, 6200B, 6200C, 6200D, 6200E, 6200F, 6200G, and 6200H which are arranged in this order (a set of projection positions).

Figure 6D:
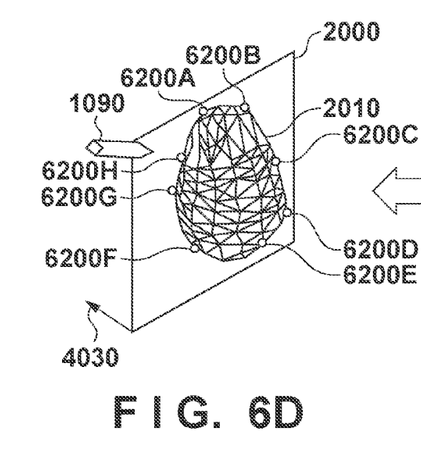

A three-dimensional shape generation unit 5020 creates the three-dimensional shape of the target virtual object 2010, as shown in FIG. 6D, by means of the method described in, for example, non-patent literature 1, using the contour data recorded by the three-dimensional shape contour generation unit 5010. Since the creation of a three-dimensional shape can use a technique known to those skilled in the art, a description thereof will not be given. Note that the method of creating a three-dimensional shape is not limited to this, and any method may be used as long as it can create a three-dimensional shape from contour data.

Referring back to FIG. 1, the virtual image generation unit 1110 generates an image of a virtual space that can be seen from a viewpoint having the position and orientation obtained by the head position and orientation estimation unit 1050. When the virtual plane 2000, vertices 6100A to 6100H, projection vertices 6200A to 6200H, and target virtual object 2010, for example, are arranged in this virtual space, the virtual space image can also include these arranged features.

The virtual image generation unit 1110 outputs the generated virtual space image to the image output unit 1130. The image output unit 1130 outputs the virtual space image received from the virtual image generation unit 1110 onto the display unit 1030 of the HMD 1000. Thus, a virtual space image corresponding to the position and orientation of the viewpoint of the user who wears the HMD 1000 on his or her head is presented right in front of his or her eyes.

Figure 7:
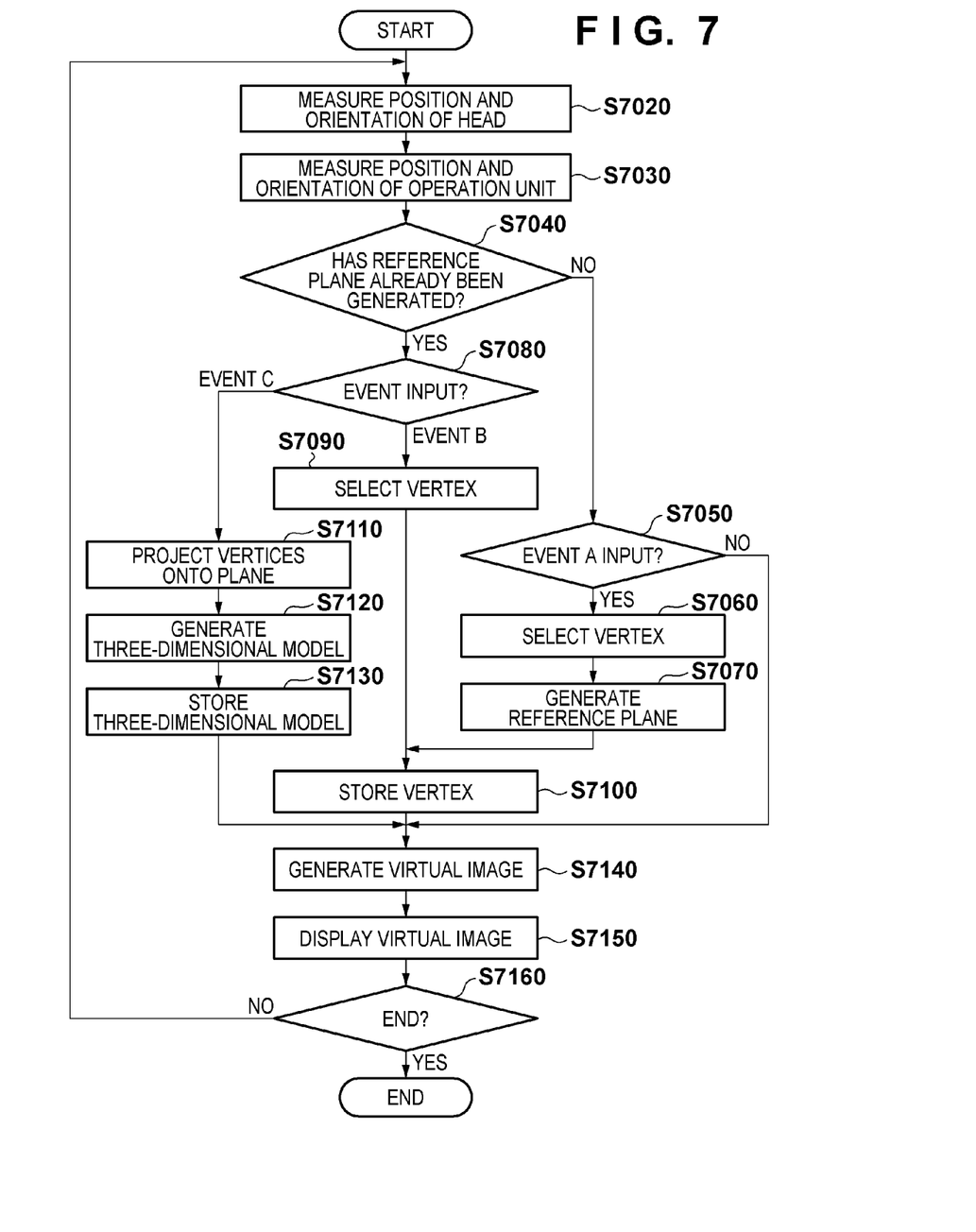
FIG. 7 is a flowchart of processing performed by an information processing apparatus 1900.

Processing performed by the information processing apparatus 1900 according to this embodiment will be described next with reference to FIG. 7 which shows a flowchart of this processing. Since details of processes in steps shown in FIG. 7 are as described above, a brief description thereof will be given.

In step S7020, the head position and orientation estimation unit 1050 acquires "a signal value representing the position and orientation of the head position and orientation measurement unit 1020 in the sensor coordinate system" via the sensor controller 2030 from the head position and orientation measurement unit 1020. The head position and orientation estimation unit 1050 then adds "the position and orientation relationship between the display unit 1030 (viewpoint) and the head position and orientation measurement unit 1020" measured in advance to the position and orientation represented by the acquired signal value, thereby obtaining "the position and orientation of the viewpoint in the sensor coordinate system".

In step S7030, the virtual object shape storage unit 1080 sequentially stores, in the storage unit 3030, "the positions and orientations of the operation unit 1090 in the sensor coordinate system" which are measured by the operation unit position and orientation measurement unit 1070 and sent from the sensor controller 2030.

In step S7040, the vertex selection unit 3010 determines whether the virtual plane 2000 has already been generated. If YES is determined in step S7040, the process advances to step S7080; otherwise, the process advances to step S7050.

In step S7050, the vertex selection unit 3010 determines whether it has received an event (event A) from the event input unit 1060. If YES is determined in step S7050, the process advances to step S7060; otherwise, the process advances to step S7140.

In step S7060, the vertex selection unit 3010 extracts "the position" of "the position and orientation of the operation unit 1090" acquired via the sensor controller 2030 around the timing when it has detected event A, and positions a vertex 4040 at the extracted position.

In step S7070, the reference plane generation unit 3020 extracts "the orientation" of "the position and orientation of the viewpoint in the sensor coordinate system" obtained by the head position and orientation estimation unit 1050 around "the timing when the vertex selection unit 3010 has detected event A". The reference plane generation unit 3020 then obtains, as a virtual plane (reference plane) 2000, a plane which has an orientation vector represented by the extracted orientation as a normal vector to it and includes the vertex 4040.

On the other hand, in step S7080, the three-dimensional shape contour generation unit 5010 determines whether it has received an event (event C) representing the end of vertex positioning mentioned above or an event (event B) of vertex positioning. If the three-dimensional shape contour generation unit 5010 determines in step S7080 that it has received event C, the process advances to step S7110; otherwise, the process advances to step S7090.

In step S7090, the three-dimensional shape contour generation unit 5010 reads out "the position and orientation of the operation unit 1090 in the sensor coordinate system" stored in the storage unit 3030 around the timing when it has detected event B. The three-dimensional shape contour generation unit 5010 then extracts "the position" of the readout position and orientation, and positions a vertex at the extracted position. In step S7100, the three-dimensional shape contour generation unit 5010 records the position extracted in step S7090 (first recording).

On the other hand, in step S7110, the three-dimensional shape contour generation unit 5010 projects the position of each vertex recorded in step S7100 onto the virtual plane 2000, thereby arranging projection vertices corresponding to these vertices on the virtual plane 2000. The three-dimensional shape contour generation unit 5010 records these projection vertices as contour data (second recording).

In step S7120, the three-dimensional shape generation unit 5020 creates the three-dimensional shape of the target virtual object 2010 using the contour data recorded by the three-dimensional shape contour generation unit 5010. In step S7130, the three-dimensional shape generation unit 5020 records the data of the target virtual object 2010, which has the created three-dimensional shape.

In step S7140, the virtual image generation unit 1110 generates an image of a virtual space that can be seen from a viewpoint having the position and orientation obtained by the head position and orientation estimation unit 1050. In step S7150, the virtual image generation unit 1110 outputs the generated virtual space image to the image output unit 1130, and the image output unit 1130 outputs the virtual space image received from the virtual image generation unit 1110 onto the display unit 1030 of the HMD 1000.

If the above-mentioned processing is to be performed for the next frame, the process returns to step S7020 through step S7160; otherwise, the process ends through step S7160.

<Modification>

A virtual object of some kind may be placed at the position and orientation of the operation unit 1090 and whether it can be placed may be switchable. The virtual plane 2000 may be visible or invisible.

Figure 1:
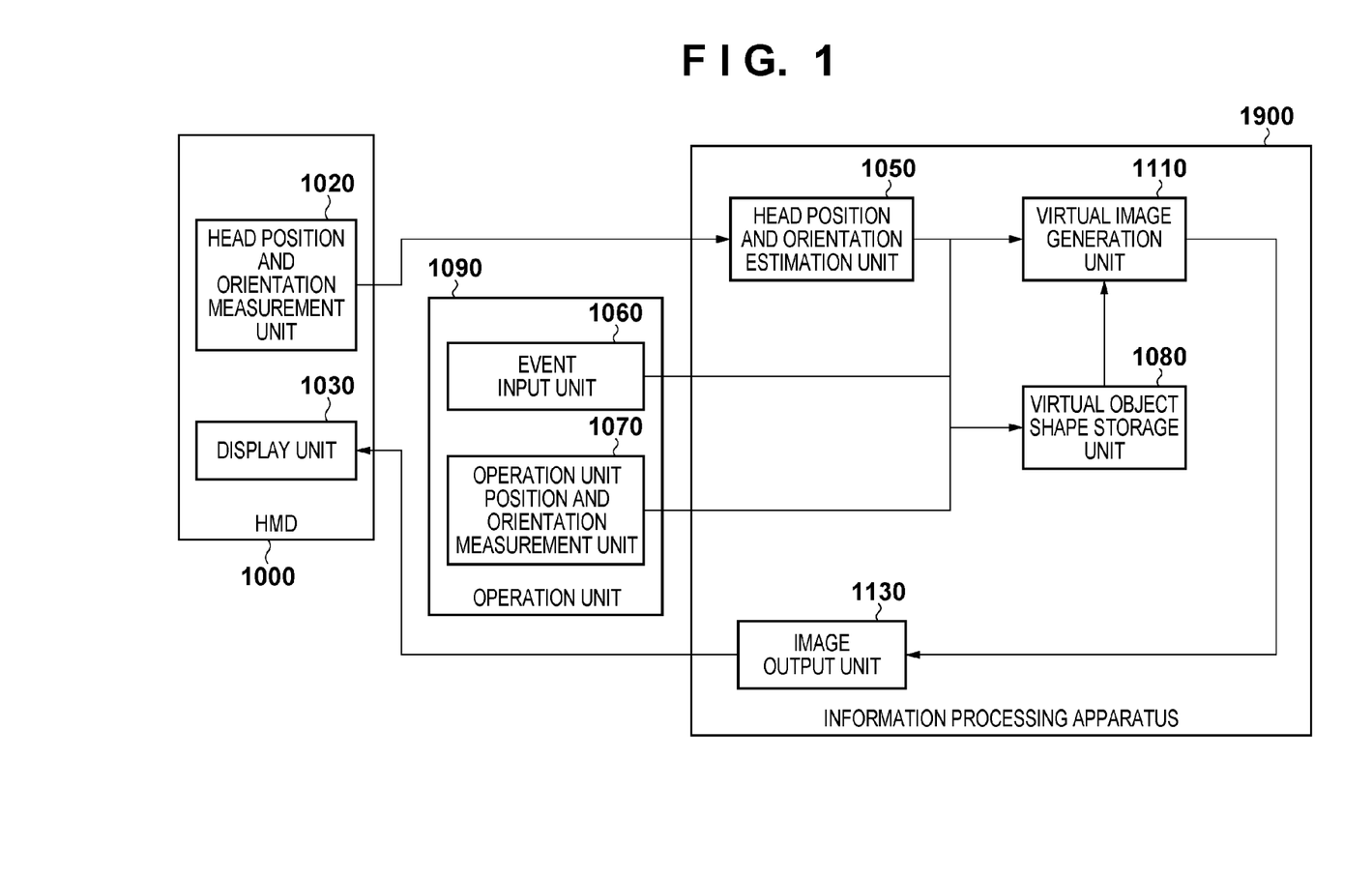
FIG. 1 is a block diagram illustrating a configuration example of a system.
Figure 2:
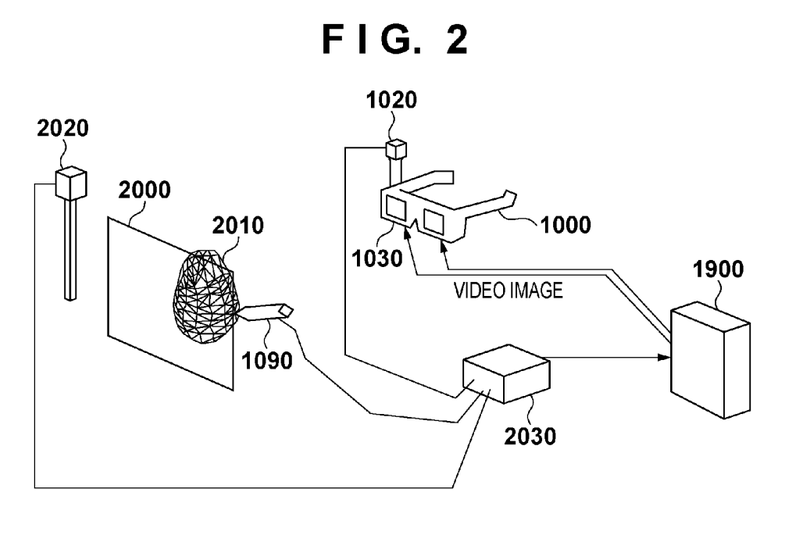
FIG. 2 is an external view of the system shown in FIG. 1.

Also, in this embodiment, the head position and orientation estimation unit 1050, virtual image generation unit 1110, virtual object shape storage unit 1080, and image output unit 1130 are assumed to be accommodated in the single information processing apparatus 1900, as shown in FIG. 1. However, not all of these functional units need be accommodated in the same apparatus, and may be distributed in a plurality of apparatuses.

Moreover, in this embodiment, after the virtual plane 2000 is set, a vertex is positioned at the position of the operation unit 1090 every time event B is input. However, a vertex may be positioned at the position measured at a predetermined time interval by the operation unit position and orientation measurement unit 1070.

Second Embodiment

Although the HMD 1000 shown in FIG. 1 is of the optical see-through type, a video see-through HMD may be used in place of the HMD 1000. A system according to this embodiment will be described with reference to a block diagram shown in FIG. 8 and an external view shown in FIG. 9. The same reference numerals as in FIGS. 1 and 2 denote the same constituent elements in FIGS. 8 and 9, and a description thereof will not be given.

Figure 8:
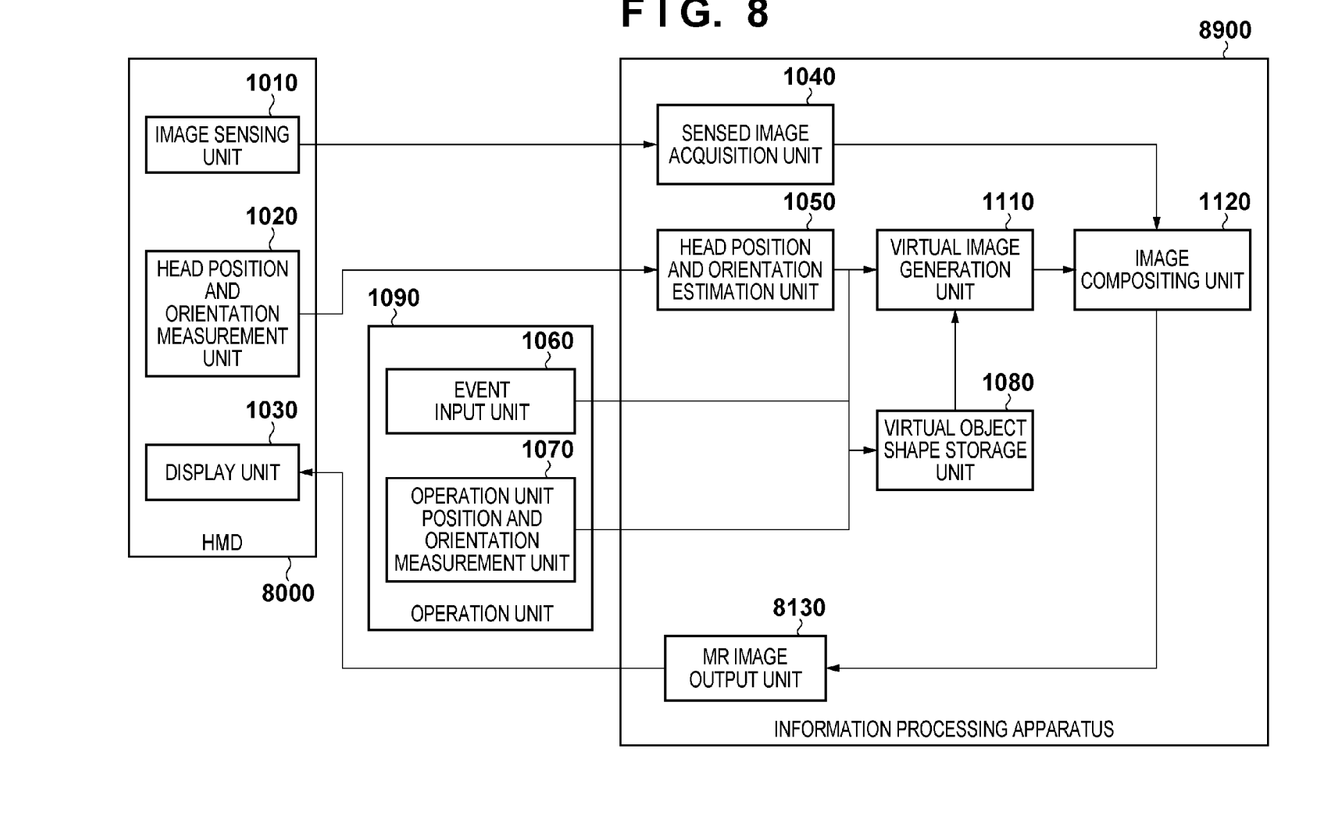
FIG. 8 is a block diagram illustrating another configuration example of a system.
Figure 9:
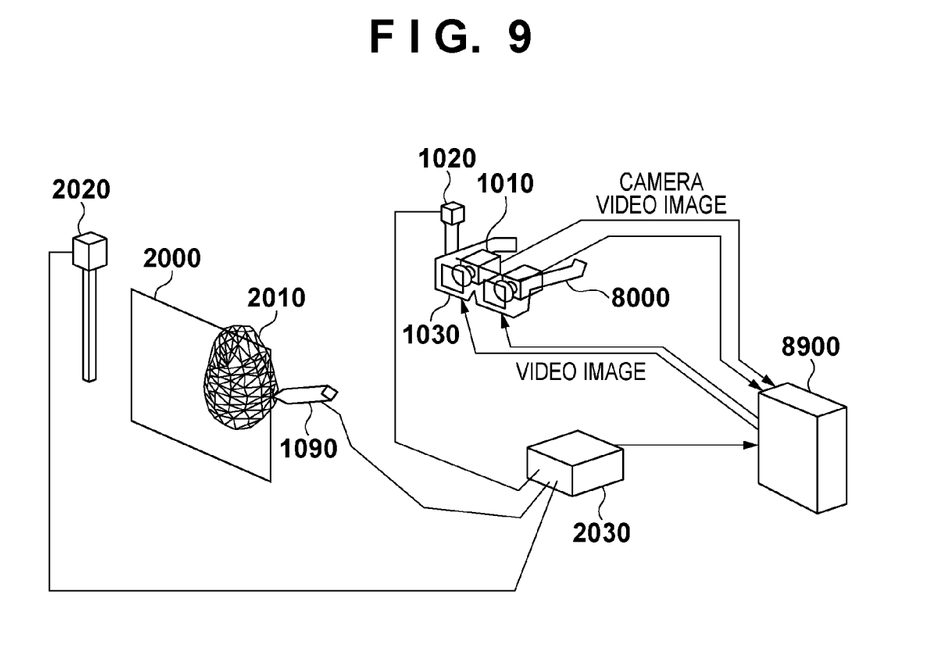
FIG. 9 is an external view of the system shown in FIG. 8.

A video see-through HMD 8000 includes an image sensing unit 1010, in addition to the constituent elements of the HMD 1000. The image sensing unit 1010 senses a moving image of a physical space, and sequentially inputs respective sensed images (physical space images) to a sensed image acquisition unit 1040 provided in an information processing apparatus 8900. The HMD 8000 includes two image sensing units 1010 for the right and left eyes, respectively, of the user who wears the HMD 8000 on his or her head. A physical space image sensed by the right-eye image sensing unit 1010 is displayed on a right-eye display unit 1030, and that sensed by the left-eye image sensing unit 1010 is displayed on a left-eye display unit 1030.

The sensed image acquisition unit 1040 sends the acquired physical space image to an image compositing unit 1120. The image compositing unit 1120 generates a composite image of the virtual space image generated by a virtual image generation unit 1110 and the physical space image acquired from the sensed image acquisition unit 1040. The image compositing unit 1120 generates two composite images for the right and left eyes, respectively. The image compositing unit 1120 then outputs the generated composite image to an MR image output unit 8130, so the MR image output unit 8130 outputs this composite image onto the display unit 1030.

Note that in the second embodiment, as in the first embodiment, not all of the functional units shown in FIG. 7, which are assumed to be accommodated in the single information processing apparatus 8900 in the foregoing description, need be accommodated in the same apparatus, and may be distributed in a plurality of apparatuses.

Figure 10:
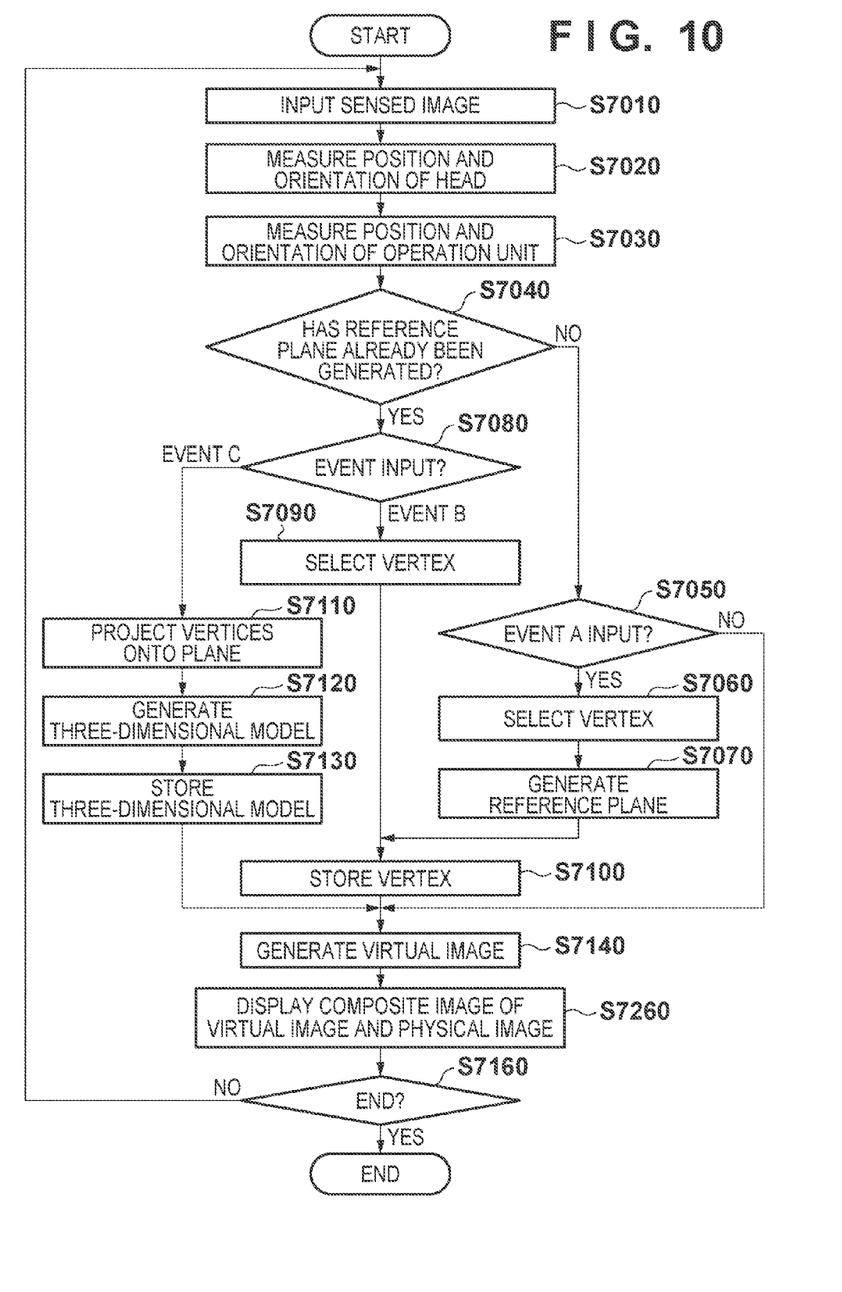
FIG. 10 is a flowchart of processing performed by an information processing apparatus 8900.
Figure 11A:
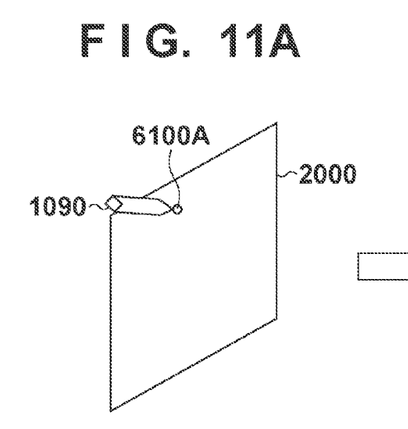
FIGS. 11A to 11D are views for explaining the 11th embodiment.
Figure 11B:
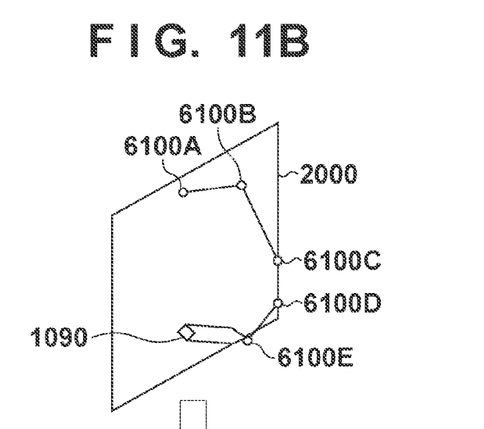
Figure 11C:
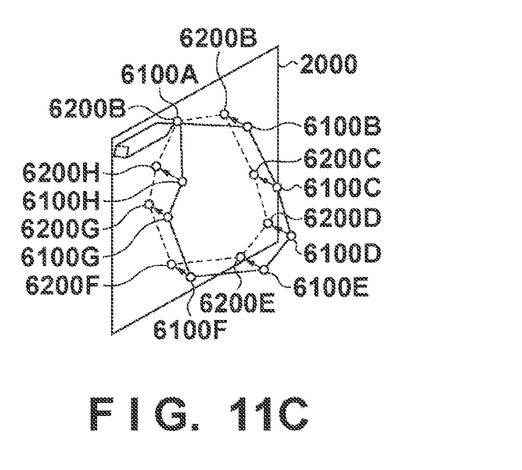
Figure 11D:
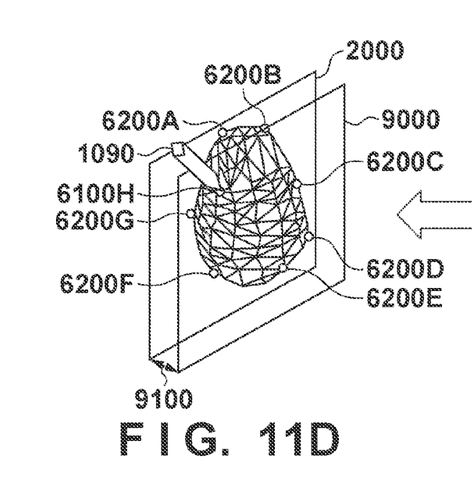

Processing performed by the information processing apparatus 8900 according to this embodiment will be described next with reference to FIG. 10 which shows a flowchart of this processing. Note that the flowchart shown in FIG. 10 is obtained by adding step S7010 to the flowchart shown in FIG. 7, and replacing step S7150 in the latter flowchart with S7260. Hence, steps S7010 and S7260 will be described herein.

In step S7010, the sensed image acquisition unit 1040 sends an acquired physical space image to the image compositing unit 1120. In step S7260, the image compositing unit 1120 generates a composite image of the virtual space image generated by the virtual image generation unit 1110 and the physical space image acquired from the sensed image acquisition unit 1040. The image compositing unit 1120 then outputs the generated composite image to the MR image output unit 8130, so the MR image output unit 8130 outputs this composite image onto the display unit 1030.

Third Embodiment

In the above-mentioned embodiments, a predetermined part of the user's body, such as his or her finger, may be used in place of the operation unit 1090. In this case, a configuration used to measure the position and orientation of the predetermined part is necessary.

Also, an event may be input based on a motion of the predetermined part of the user. In this case, a configuration used to recognize a motion of the predetermined part and specify an input event represented by the recognized motion is necessary. In either case, both the operation unit 1090 such as a stylus and the predetermined part of the user's body function as pointing devices operated by the user.

Fourth Embodiment

Various methods are available to obtain a virtual plane 2000. For example, a plane which has the orientation vector of the viewpoint as a normal vector to it and includes the position of one of the arranged vertices (the vertices 6100A to 6100H in FIG. 6C) or the barycentric position defined by the positions of a plurality of vertices among these arranged vertices may be obtained as the virtual plane 2000. In this case, vertex positioning processing is performed earlier than setting of the virtual plane 2000.

Fifth Embodiment

Various methods are available to obtain a virtual plane 2000. For example, three vertices may be designated in place of the vertex 4040, and a plane including the positions of these designated vertices may be obtained as the virtual plane 2000.

Sixth Embodiment

Various methods are available to obtain a virtual plane 2000. For example, a plane which is parallel to one of the X-Y plane, Y-Z plane, and Z-X plane defined in a world coordinate system and includes a vertex 4040 may be set as the virtual plane 2000. The world coordinate system means a coordinate system which has a single point in a physical space as its origin, and three axes orthogonal to each other at this origin as its X-, Y-, and Z-axes. Note that a vertex determined in advance may be used in place of the vertex 4040.

Seventh Embodiment

Various methods are available to obtain a virtual plane 2000. For example, the orientation vector of an operation unit 1090 may be used in place of that of the viewpoint in the first embodiment.

Eighth Embodiment

Various methods are available to obtain a virtual plane 2000. For example, a plane which has the orientation vector of an operation unit 1090 as a normal vector to it and includes a point spaced apart from the position of the viewpoint by a specific distance may be obtained as the virtual plane 2000.

Ninth Embodiment

Various methods are available to obtain a virtual plane 2000. For example, a plane which has a vector passing through the position of the viewpoint and that of an operation unit 1090 as a normal vector to it and includes the position of the operation unit 1090 may be obtained as the virtual plane 2000.

10th Embodiment

In the above-mentioned embodiments, the virtual plane 2000 set using a method of some kind is fixed intact. However, newly re-creating the virtual plane 2000 using another method makes it possible to set a virtual plane 2000 complying with a user's demand in accordance with circumstances. That is, one of methods of creating a plurality of types of virtual planes 2000 described in the above-mentioned embodiments is selected at an arbitrary timing, and the currently complete virtual plane 2000 is replaced with a virtual plane 2000 generated by the newly selected creation method. Note that this switching between creation methods may be done using, for example, a keyboard and a mouse, or voice input.

11th Embodiment

Although the shape of a target virtual object is created using the method described in non-patent literature 1 in the first embodiment, the target virtual object may be deformed in accordance with the moving distance of an operation unit 1090. For example, a virtual plane 2000 is created so as to include a vertex 6100A, as shown in FIGS. 11A to 11D. Then, a virtual plane 9000 which includes a vertex 6100H farthest from the virtual plane 2000 and is parallel to the virtual plane 2000 is created, and the dimension of the target virtual object in the normal direction to the virtual plane 2000 is determined in accordance with a distance 9100 between the virtual planes 2000 and 9000.

12th Embodiment

Although a system which provides a virtual space or a mixed reality space to one user has been described in the above-mentioned embodiments, this service may be provided to a plurality of users. Also, a plurality of users may cooperatively perform, for example, an operation associated with setting of a virtual plane 2000 and an operation of designating a vertex group using an operation unit 1090.

13th Embodiment

Each unit which constitutes an information processing apparatus 1900 or 8900 may use hardware. However, each unit excluding a virtual object shape storage unit 1080, image output unit 1130, MR image output unit 8130, sensed image acquisition unit 1040, and storage unit 3030 may be implemented by a computer program. In this case, the computer program is installed on a computer and executed by the computer, thereby making it possible to implement the function of a corresponding functional unit.

Figure 12:
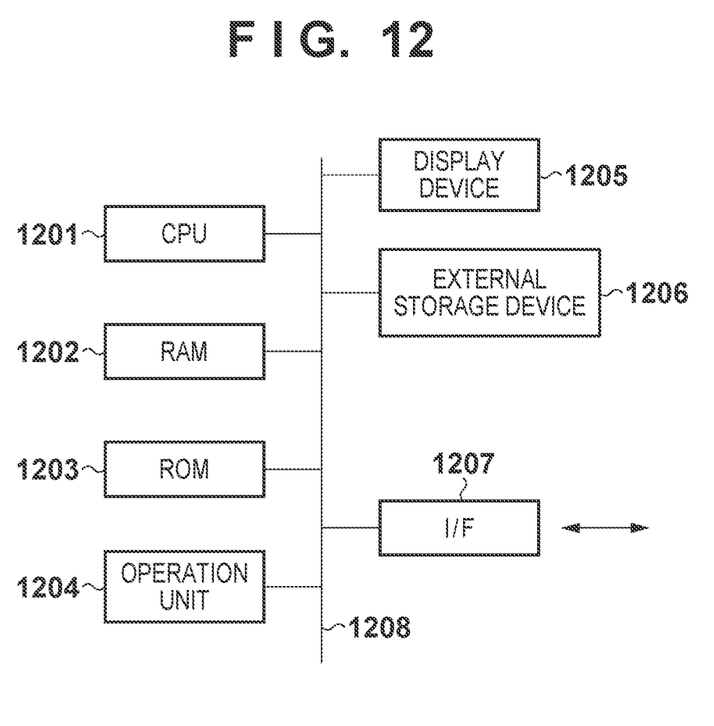
FIG. 12 is a block diagram illustrating a configuration example of a computer applicable to the information processing apparatus 1900 or 8900.

A configuration example of a computer applicable to the information processing apparatus 1900 or 8900 will be described with reference to a block diagram shown in FIG. 12. As a matter of course, the configuration of a computer applicable to the information processing apparatus 1900 or 8900 is not limited to this, and any configuration may be used as long as it can acquire necessary data and execute an implemented computer program using the acquired data.

A CPU 1201 controls the overall operation of the computer using computer programs and data stored in a RAM 1202 and ROM 1203, and executes the above-mentioned respective types of processing assumed to be performed by the information processing apparatus 1900 or 8900.

The RAM 1202 has an area for temporarily storing a computer program and data loaded from an external storage device 1206, and data received from the outside via an I/F (interface) 1207. The RAM 1202 also has a work area used to execute various types of processing by the CPU 1201. That is, the RAM 1202 can provide various areas as needed. The ROM 1203 stores, for example, setting data and a boot program of the computer.

An operation unit 1204 uses, for example, a mouse and a keyboard and can input various instructions to the CPU 1201 upon a user's operation. An event representing the end of vertex positioning mentioned above, for example, can be input using the operation unit 1204.

A display device 1205 uses, for example, a CRT or a liquid crystal screen, and can display the processing result obtained by the CPU 1201 using, for example, an image or a text. The display device 1205 can display, for example, a virtual space image output from the image output unit 1130, and a composite image output from the MR image output unit 8130.

The external storage device 1206 is a mass storage device such as a hard disk drive device. The external storage device 1206 stores computer programs and data for causing the CPU 1201 to execute an OS (Operating System) and the above-mentioned respective types of processing assumed to be performed by the information processing apparatus 1900 or 8900. These computer programs include computer programs for causing the CPU 1201 to implement the function of each unit excluding the virtual object shape storage unit 1080, image output unit 1130, MR image output unit 8130, sensed image acquisition unit 1040, and storage unit 3030. Also, these data include not only data associated with a virtual space but also the above-mentioned known information. The computer programs and data stored in the external storage device 1206 are loaded into the RAM 1202 as needed in accordance with the control of the CPU 1201, and are processed by the CPU 1201.

Note that the virtual object shape storage unit 1080 and storage unit 3030 can be implemented by, for example, the external storage device 1206 or RAM 1202. As a matter of course, the virtual object shape storage unit 1080 and storage unit 3030 may use a single memory or separate memories.

The I/F 1207 is used to connect, for example, the HMD 1000 or 8000 and the sensor controller 2030 to each other. The computer communicates data with these apparatuses via the I/F 1207. The image output unit 1130, MR image output unit 8130, and sensed image acquisition unit 1040 can be implemented by the I/F 1207. The above-mentioned respective units are connected to a bus 1208.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-195073 filed Aug. 31, 2010, which is hereby incorporated by reference herein in its entirety.

What is claimed is:

1. An information processing apparatus comprising:
   a first acquisition unit configured to acquire a three-dimensional position of a pointing device operated by a user or a predetermined portion of the user;
   a second acquisition unit configured to acquire a position and orientation of a viewpoint of the user;
   a setting unit configured to set a virtual plane in a virtual space, on the basis of the acquired orientation of the viewpoint and the acquired three-dimensional position, wherein said setting unit sets, as the virtual plane, a plane which has a vector passing through the position of the viewpoint and the position of the pointing device or the predetermined portion as a normal vector thereto;
   a third acquisition unit configured to acquire a pointed position on the virtual plane by projecting the acquired three-dimensional position onto the virtual plane;
   a first generation unit configured to generate a virtual object whose contour is represented on the basis of the acquired pointed positions on the virtual plane;
   a second generation unit configured to generate an image of the virtual space seen from the viewpoint on the basis of the acquired position and orientation of the viewpoint, the virtual space including the virtual object; and
   an output unit which outputs the generated image of the virtual space.

2. The apparatus according to claim 1, wherein the virtual plane includes the position of the pointing device or the predetermined portion.

3. The apparatus according to claim 1, wherein
   said first acquisition unit acquires three positions of the pointing device or the predetermined portion, and
   said setting unit sets a plane including the three positions as the virtual plane.

4. The apparatus according to claim 1, wherein said first acquisition unit acquires the three-dimensional position at each specific timing.

5. The apparatus according to claim 4, wherein the specific timing is a timing when the information processing apparatus has detected an event generated in the pointing device upon pressing a button provided in the pointing device.

6. The apparatus according to claim 4, wherein the specific timing is a timing that comes at a predetermined time interval.

7. The apparatus according to claim 1, further comprising:
   a fourth acquisition unit configured to acquire an image of a physical space, that is sensed by an image sensing device having the position and orientation of the viewpoint; and
   said output unit composites the image of the virtual space and the image of the physical space to output the composited image.

8. The apparatus according to claim 1, wherein said third acquisition unit records the acquired three-dimensional positions as a trajectory of the pointing device or the predetermined portion, and projects the trajectory onto the virtual plane to record the projected trajectory as the pointed positions representing the contour of the virtual object on the virtual plane.

9. The apparatus according to claim 8, wherein said third acquisition unit obtains a projection position at which each three-dimensional position which forms the trajectory is projected onto the virtual plane along an orientation vector of the viewpoint as the pointed position on the virtual plane.

10. The apparatus according to claim 1, wherein the predetermined portion of the user is a finger of the user.

11. An information processing method comprising:
    a first acquisition step of acquiring a three-dimensional position of a pointing device operated by a user or a predetermined portion of the user;
    a second acquisition step of acquiring a position and orientation of a viewpoint of the user;
    a setting step of setting a virtual plane in a virtual space, on the basis of the acquired orientation of the viewpoint and the acquired three-dimensional position, wherein the setting step sets, as the virtual plane, a plane which has a vector passing through the position of the viewpoint and the position of the pointing device or the predetermined portion as a normal vector thereto;
    a third acquisition step of acquiring a pointed position on the virtual plane by projecting the acquired three-dimensional position onto the virtual plane;
    a first generation step of generating a virtual object whose contour is represented on the basis of the acquired pointed positions on the virtual plane;
    a second generation step of generating an image of the virtual space seen from the viewpoint on the basis of the acquired position and orientation of the viewpoint, the virtual space including the virtual object; and
    an output step of outputting the generated image of the virtual space.

12. A non-transitory computer-readable storage medium storing a computer program for causing a computer to function as each unit of an information processing apparatus defined in claim 1.

* * * * *